(12) United States Patent
Falvey et al.

(10) Patent No.: US 12,578,261 B2
(45) Date of Patent: Mar. 17, 2026

(54) ID CARD PEEL SAMPLE PREPARATION APPARATUS AND METHOD

(71) Applicant: The United States of America, Washington, DC (US)

(72) Inventors: Daniel J Falvey, Brunswick, MD (US); William G Pinson, Frederick, MD (US); Tyler W Wood, Silver Spring, MD (US)

(73) Assignee: The United States of America as Represented by the Government Publishing Office, Washington, DC (US)

( * ) Notice: Subject to any disclaimer, the term of this patent is extended or adjusted under 35 U.S.C. 154(b) by 452 days.

(21) Appl. No.: 18/328,868

(22) Filed: Jun. 5, 2023

(65) Prior Publication Data

US 2024/0402072 A1     Dec. 5, 2024

(51) Int. Cl.
*G01N 19/04* (2006.01)
*B26D 3/08* (2006.01)
*B26D 7/26* (2006.01)

(52) U.S. Cl.
CPC ............. *G01N 19/04* (2013.01); *B26D 3/085* (2013.01); *B26D 7/2628* (2013.01)

(58) Field of Classification Search
CPC ... G01N 2203/0091; G01N 2203/0298; G01N 19/04; B26D 3/085; B26D 5/02; B26D 5/08; B26D 7/2614; B26D 7/2628
See application file for complete search history.

(56) References Cited

U.S. PATENT DOCUMENTS

| | | | |
|---|---|---|---|
| 177,496 | A | 5/1876 | Gafney |
| 611,238 | A | 9/1898 | Drinkaus |
| 764,374 | A | 7/1904 | Remsen |
| 782,121 | A | 2/1905 | Foreman |
| 1,228,728 | A | 6/1917 | White |
| 1,286,465 | A | 12/1918 | Whited et al. |
| 1,305,159 | A | 5/1919 | Plunkett |
| 1,380,814 | A | 6/1921 | Lindsay |
| 1,421,599 | A | 7/1922 | Sorenson |
| 1,432,072 | A | 10/1922 | Lodge |
| 1,487,381 | A | 3/1924 | Helms |

(Continued)

FOREIGN PATENT DOCUMENTS

| | | | | |
|---|---|---|---|---|
| CN | 114619517 A | * | 6/2022 | ............... B26D 7/02 |

OTHER PUBLICATIONS

Marketing web page for Andilog Technologies, "Double blade knife for peeling sample preparation 15mm and 1 inch." 2 pages, Retrieved from Internet: <https://www.andilog.com/double-blade-knife-peeling-sample-preparation-peel-test.html> [last visited Mar. 8, 2023].

(Continued)

*Primary Examiner* — Stephen D Meier
*Assistant Examiner* — Quang X Nguyen

(57) ABSTRACT

Embodiments of the invention include systems and methods for providing a process to produce consistent 3-dimensional samples for the analysis of production quality laminated bodies when targeting a specific depth in a laminated card body comprising a bottom fixture plate, a top guide plate, a cutting block with an adjustable cutting blade holder that can be moved up and down as the adjusting knob is turned.

20 Claims, 14 Drawing Sheets

(56) References Cited

U.S. PATENT DOCUMENTS

| 1,609,093 | A | 11/1926 | Miller |
|---|---|---|---|
| 1,627,622 | A | 5/1927 | Schreiner |
| 1,712,008 | A | 5/1929 | Rice |
| 2,029,625 | A | 2/1936 | Lee et al. |
| 2,091,337 | A | 8/1937 | Sahl |
| 2,134,839 | A | 11/1938 | Perkins |
| 2,176,733 | A | 10/1939 | Fanning |
| 2,464,206 | A | 3/1949 | Becker |
| 2,552,353 | A | 5/1951 | Troth et al. |
| 2,669,267 | A | 2/1954 | Miller |
| 2,772,476 | A | 12/1956 | Glotzer |
| 3,470,923 | A | 10/1969 | Besthome |
| 3,724,071 | A | 4/1973 | Hurtubise |
| 4,176,572 | A | 12/1979 | Pennington |
| 4,231,275 | A | 11/1980 | Onishi |
| 4,457,199 | A | 7/1984 | Corcoran |
| 4,472,879 | A | 9/1984 | Sizemore, Jr. |
| 4,578,865 | A | 4/1986 | Keller |
| 4,590,834 | A | 5/1986 | Sobel |
| 5,203,086 | A | 4/1993 | Dunn |
| 5,337,481 | A | 8/1994 | Mears |
| 5,951,580 | A | 9/1999 | Ashraf |
| 6,308,422 | B1 | 10/2001 | MacDonald |
| 6,416,524 | B1 | 7/2002 | Critz |
| 6,533,325 | B1 | 3/2003 | Steidinger |
| 7,128,793 | B2 | 10/2006 | Haldner et al. |
| 7,172,670 | B2 | 2/2007 | Franko, Sr. |
| 7,743,512 | B1 | 6/2010 | Whttemore |
| 7,909,955 | B2 | 3/2011 | Warther |
| 8,069,546 | B1 | 12/2011 | Whittemore |
| 8,635,781 | B2 | 1/2014 | Fischer |
| 8,814,872 | B2 | 8/2014 | Bickenbach |
| 8,936,693 | B2 | 1/2015 | Manes et al. |
| 8,992,712 | B2 | 3/2015 | Loy et al. |
| 9,533,427 | B1 * | 1/2017 | Heintzelman, Jr. ...... B26D 7/26 |
| 10,179,055 | B2 | 1/2019 | Sverrisson et al. |
| 2003/0100654 | A1 | 5/2003 | Chheang et al. |
| 2011/0001670 | A1 | 1/2011 | Coleman et al. |
| 2011/0289647 | A1 | 12/2011 | Chiao et al. |
| 2012/0234150 | A1 * | 9/2012 | Holtgreive ........... B26F 1/3853 |
| | | | 83/613 |
| 2012/0277360 | A1 | 11/2012 | Scheffer et al. |
| 2014/0060722 | A1 | 3/2014 | Finn |
| 2014/0322500 | A1 | 10/2014 | Depres et al. |
| 2016/0036209 | A1 | 2/2016 | Manabe |
| 2018/0231891 | A1 | 8/2018 | Clapper et al. |
| 2020/0302261 | A1 | 9/2020 | Maeda |

OTHER PUBLICATIONS

Marketing brochure for Q-Card, "Module Adhesion, Embossed Character & Peel Tester," 8 pages, 2021. Retrieved from Internet: <https://www.q-card.com/brochures/5-3-2019/Q-Card%20Module%20Adhesion%20Embossed%20Character%20and%20Peel%20Tester.pdf> [last visited Mar. 8, 2023].

Marketing web page for Testresources, "Sample Cutters," 6 pages, 2022. Retrieved from Internet: <https://www.testresources.net/accessories/sample-preparation-aids/sample-cutters/> [last visited Mar. 8, 2023].

* cited by examiner

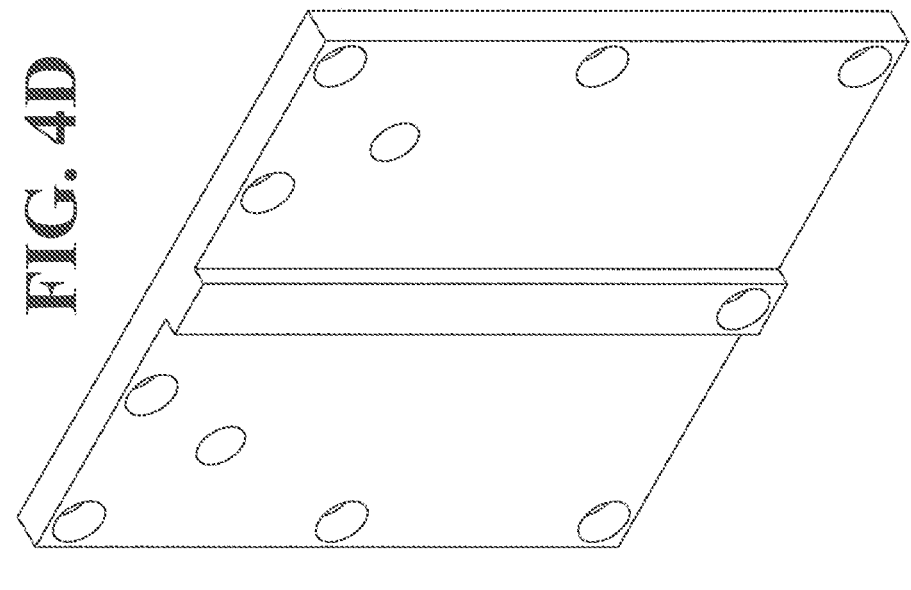
FIG. 4D
FIG. 4C
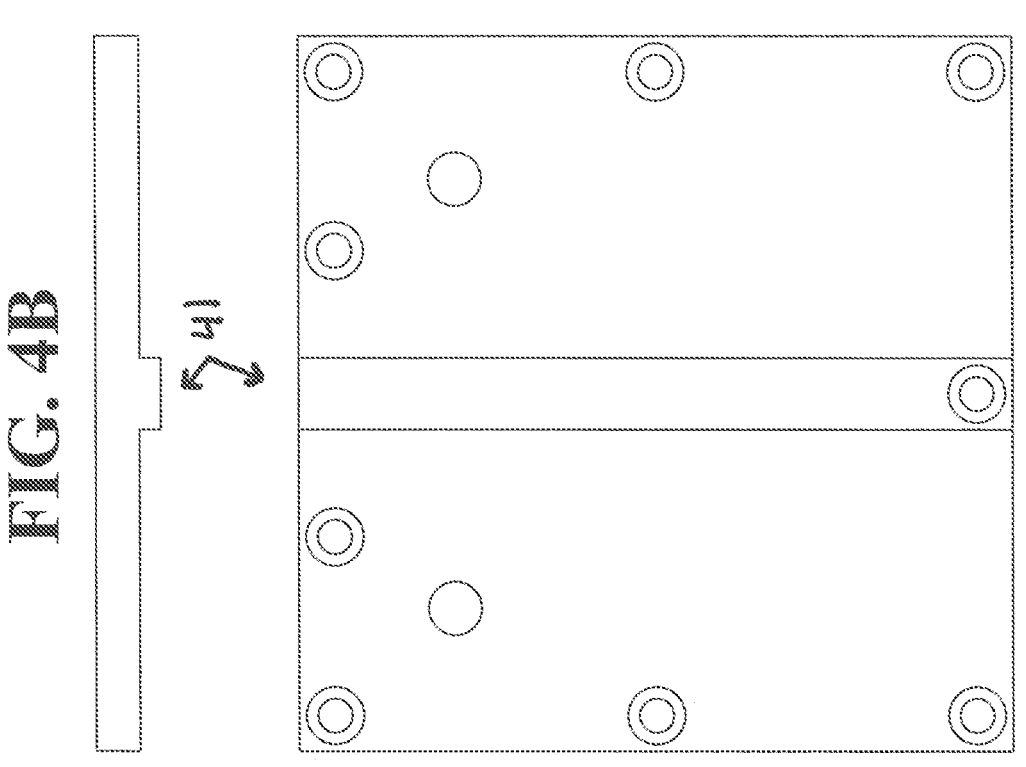
FIG. 4B
FIG. 4A

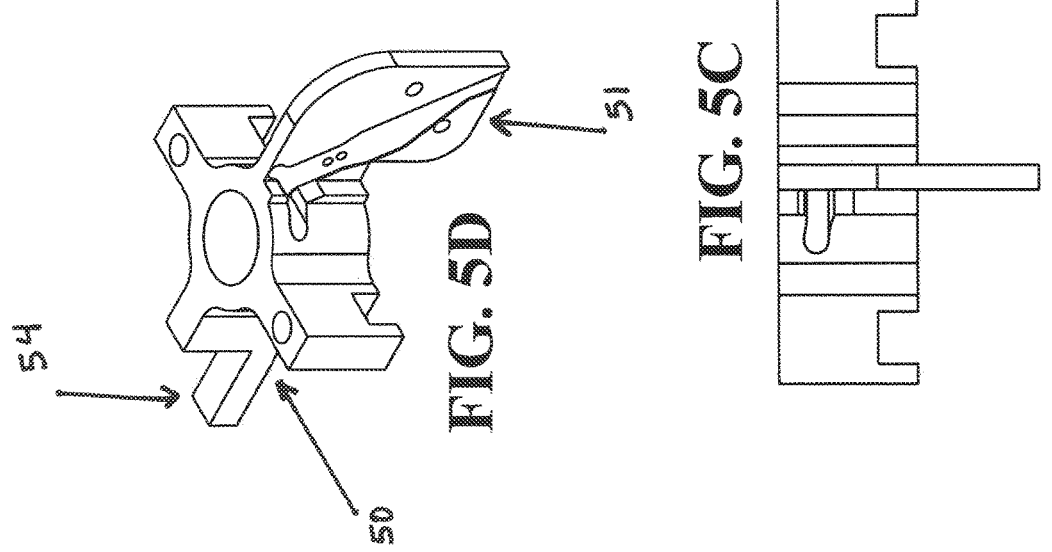
FIG. 5A
FIG. 5D
FIG. 5C
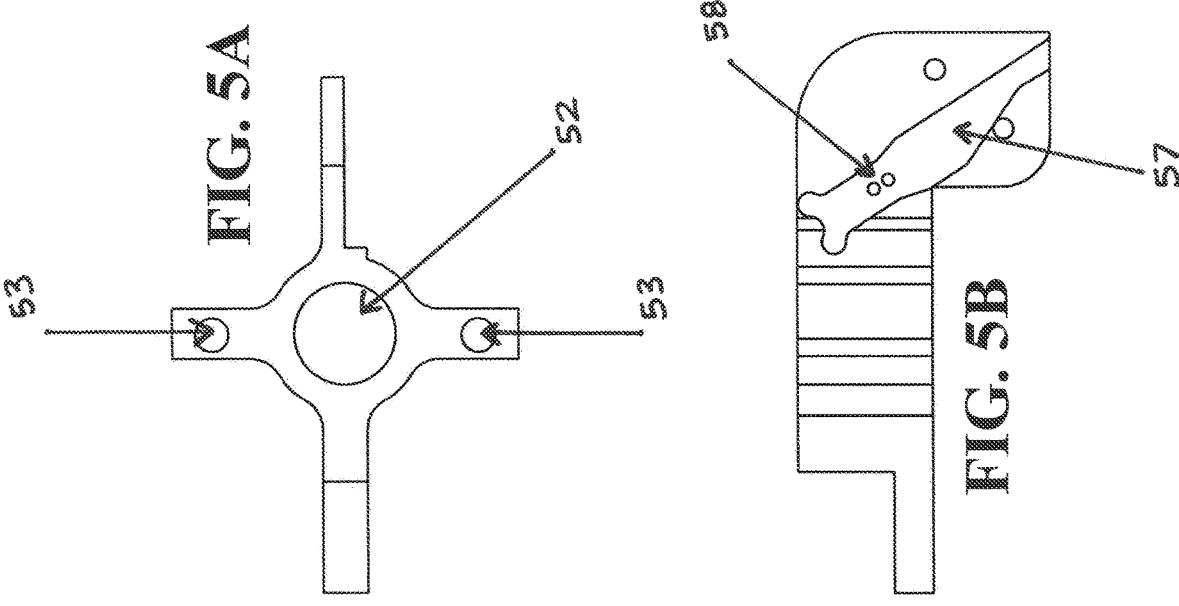
FIG. 5B

FIG. 6D
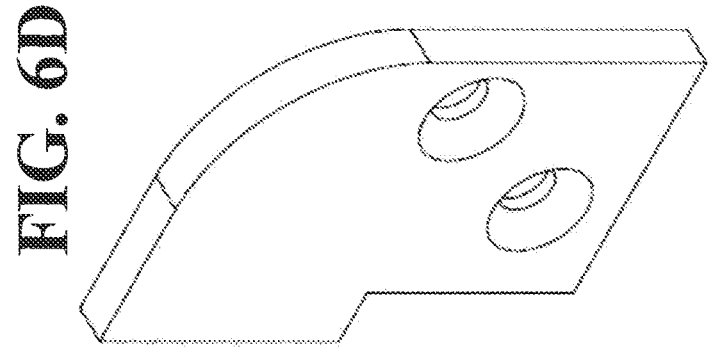
FIG. 6B
FIG. 6C
60
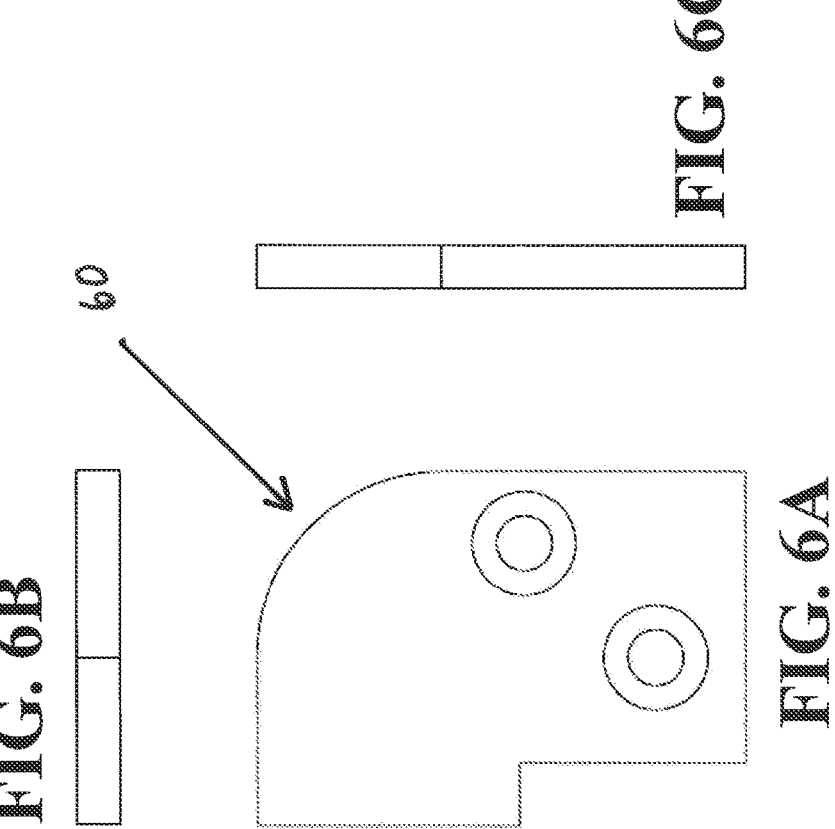
FIG. 6A

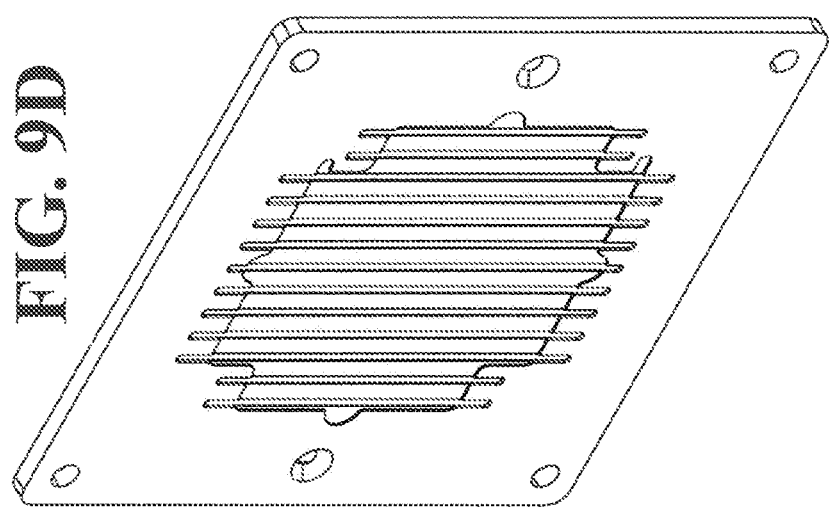
FIG. 9D
FIG. 9C
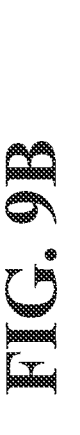
FIG. 9B
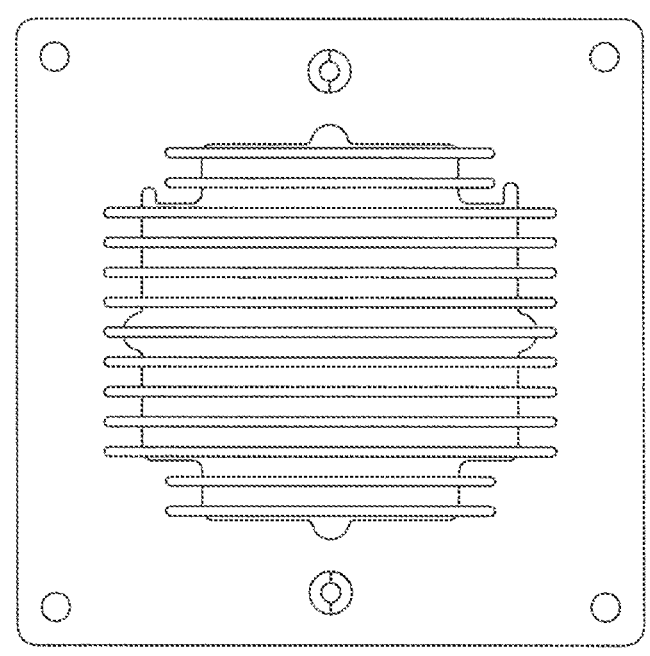
FIG. 9A

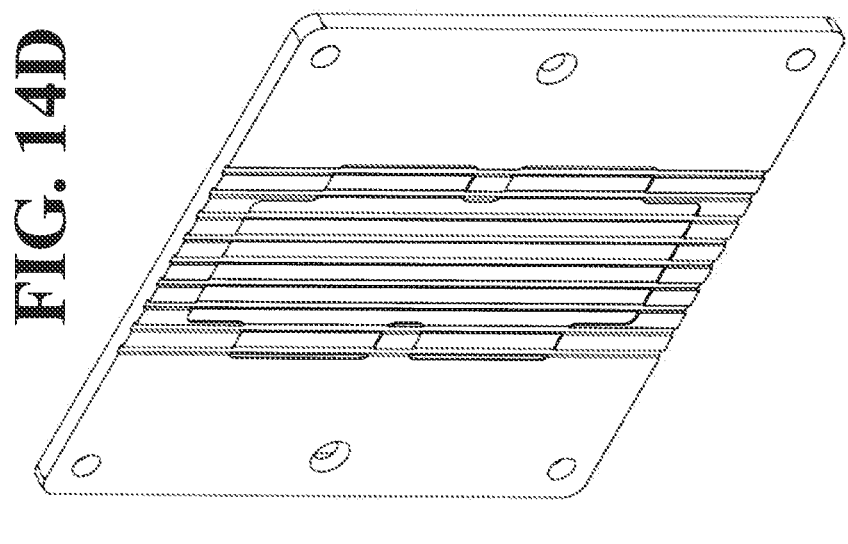
FIG. 14D
FIG. 14C
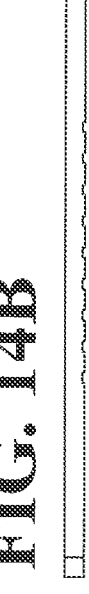
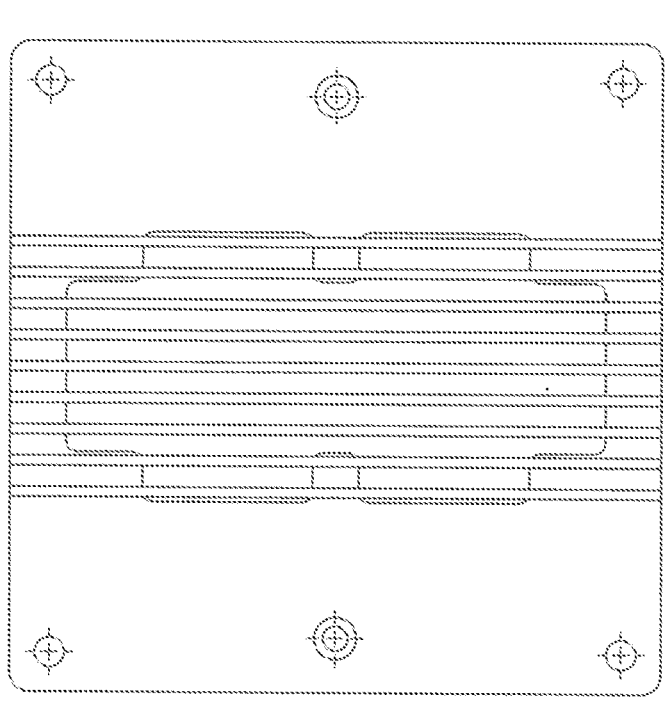
FIG. 14B
FIG. 14A

ID CARD PEEL SAMPLE PREPARATION APPARATUS AND METHOD

FEDERALLY SPONSORED RESEARCH AND DEVELOPMENT

The invention described herein is related to the inventors' duties as government employees. The invention described herein may be manufactured and used by or for the government of the United States for all governmental purposes without the payment of any royalty.

FIELD OF THE INVENTION

The invention relates to systems and methods for producing peel test samples from laminated cards. More specifically, the invention relates to a system and method of producing peel test samples from laminated cards that allows for the preparation of multiple samples with the same thickness and width.

The purpose of a peel test is to determine interfacial peel strength for multilayered laminated cards used in secure credentials and documents. Laminated cards are produced from a stack of individual materials that are fused through heat and pressure to create a card. These laminated cards can be fused with or without adhesive included between layers. To determine if the lamination process is controlled and that specific customer determined areas are laminated sufficiently to meet required interfacial peel strength, samples must be prepared using referenced standard width requirements at specific depths within a laminated card.

The preferred embodiment of the invention produces peel test samples from laminated ID3 sized cards (125 mm×88 mm) as described in ISO 7810. Peel test sample production is referenced in standards ISO 10373-1 section 5.3 and ANSI 322 section 5.1. To produce accurate peel test samples to test specific lamination layers, the laminated card must be cut to a specific depth while simultaneously cut to a specific width.

The system of the invention will be used to prepare peel test samples from production quality laminated identification cards. To determine the quality of bonding between layers and the encapsulation of printing or security features, peel testing must be performed to determine the interfacial peel strength at specific layers in the card body. The system is used to create samples prepared to specified length, width, and depth for the evaluation of specified sample layers to reduce sample data variation and determine an accurate interfacial peel strength for laminated layers.

BACKGROUND OF THE INVENTION

It is desirable to have a system and method for producing peel test samples from laminated cards that controls the length, width, and depth of a sample, that is applicable to laminated cards and other laminated systems using paper or polymer substrates with or without adhesives, and that is a single system requiring only bottom fixture plate changes to accommodate different sized specimens.

Current systems for preparation of peel test samples do not provide control over the depth of the cut into the laminated card. The invention allows for control of the cut length, width, and depth of the sample to produce accurate test specimens with desired 3-dimensional requirements for a peel test targeting a layer of interest.

SUMMARY OF THE INVENTION

Embodiments of the present invention are directed to an apparatus, systems and methods for producing peel test samples from laminated card bodies that obviate one or more of the limitations and disadvantages of prior systems and methods. The apparatus is comprised of four interrelated components. In use, the workpiece, which is a sample to be tested, is placed on a bottom fixture plate. A top guide plate is then releasably affixed to the bottom fixture plate to rigidly hold the workpiece in position. A cutting block is used to score the laminated workpiece. The cutting block has an adjustable blade holder and means for adjusting the depth at which the blade will score the laminated workpiece.

In one embodiment, an apparatus for creating uniform peel test samples from a multilayered card includes a bottom fixture plate, a top guide plate, and a cutting block.

The bottom fixture plate has a plurality of mating connectors, a first pocket, and a first set of slots disposed on the bottom fixture plate. The first pocket is sized to receive a card made of multiple layers. The bottom fixture plate may also include a second pocket also sized to receive a card made of multiple layers, where the second pocket is oriented orthogonally to the first pocket. Each one of the first set of slots is located parallel to one side of the bottom fixture plate. The first set of slots may be milled into the bottom fixture plate on 10-millimeter centers. The bottom fixture plate may also include a second set of slots that are milled at 10-millimeter centers into the bottom fixture plate parallel to one side of the bottom fixture plate, and oriented orthogonally to the first set of slots. The bottom fixture plate may also include a plurality of apertures to allow the bottom fixture plate to be fixed to a surface.

The top guide plate has a series of channels each having a slot shaped aperture. These channels may be of uniform width and length, and the channels can be spaced on 10-millimeter centers. The top guide plate also has a plurality of complementary mating connectors disposed on the top guide plate. The mating connectors on the top guide plate align with the mating connectors disposed on the bottom fixture plate such that when the top guide plate is placed on the bottom fixture plate, the channel slots in the top guide plate align with the first set of slots located on the bottom fixture plate.

Optionally, the complementary mating connectors on the top guide plate may align with the plurality of mating connectors on the bottom fixture plate whether the top guide plate is placed on the bottom fixture plate in a first orientation or is placed on the bottom fixture plate in a second orientation orthogonal to the first orientation. Also, the mating connectors on the bottom fixture plate are, for example, posts extending from the bottom fixture plate, and the complementary mating connectors on the top guide plate are, for example, apertures in the top guide plate.

The cutting block is a hollow cube having a top, a bottom, and four sides. The bottom of the cutting block includes a tang that is sized to fit into any one of the channels in the top guide plate. An adjusting hub is located inside the cutting block. The adjusting hub has a center aperture, a cutting blade holder, and a flange that extends from the center aperture. The cutting blade holder protrudes from the rear of the cutting block and is shaped to receive a cutting blade. The cutting blade holder may also include a blade side cover attached to the cutting blade holder to hold the cutting blade in the cutting blade holder. The cutting blade may extend from the cutting blade holder approximately 0.020 inches from the bottom of the cutting blade holder. The adjusting hub may also include two stabilizing flanges that extend on opposite sides from the center aperture. Each of the stabilizing flanges includes an aperture to receive a dowel, and a stabilizing spring slips over each dowel such that the stabilizing spring extends from the stabilizing flange to contact the bottom of the cutting block such that the adjusting hub is in connection with the base of the cutting block through the stabilizing springs.

A threaded adjusting rod is rotatably connected to the adjusting hub through the center aperture. The connection between the threaded adjusting rod and the adjusting hub may be achieved, for example, by using a nut that is fixed into the center aperture of the adjusting hub. The adjusting rod passes through an aperture in the top of the cutting block and is connected to an adjusting knob located above the top of the cutting block so that the cutting blade holder can be moved up and down as the adjusting knob is turned. The adjusting rod may be held in place by a set screw.

The cutting block may also include a depth gauge having a depth gauge needle. The depth gauge needle would be inserted through a second aperture in the top of the cutting block, and the tip of the needle would sit on the flange that extends from the center aperture of the adjusting hub.

According to another embodiment, an apparatus for creating uniform peel test samples from a multilayered card includes a bottom fixture plate, a top guide plate, and a cutting block is disclosed. The bottom fixture plate includes a pocket, a plurality of slots, and a plurality of mating connectors disposed thereon. The top guide plate has a plurality of channels and a plurality of complementary mating connectors. Each channel in the top guide plate has a slot shaped aperture. The slots in the bottom fixture plate align with the slot shaped apertures in the top guide plate when the complementary mating connectors of the top guide plate and the mating connectors of the bottom fixture plate are aligned and the top guide plate is in contact with the bottom fixture plate. The cutting block has a tang formed on the underside of the cutting block, an adjusting hub including a cutting blade, and an adjustment shaft wherein the adjusting hub can be moved in a direction perpendicular to the top guide plate by movement of the adjusting shaft.

According to yet another embodiment, a method for creating uniform peel test samples from multilayered laminated cards using an apparatus is disclosed. The laminated card has a first face and a second face opposite the first face. The apparatus includes a bottom fixture plate, a top guide plate, and a cutting block. The bottom fixture plate has a first pocket and a second pocket that is oriented at an angle orthogonal to the first pocket, a set of slots formed onto the bottom fixture plate with the set of slots parallel to one side of the bottom fixture plate, and a plurality of mating connectors on the bottom of the fixture plate. The top guide plate has a series of channels formed into it that are of uniform width and length. Each of the channels has a slot shaped aperture through the center of the channel, and a plurality of complementary mating connectors disposed on the top guide plate. The slots in the bottom fixture and the slot shaped apertures in the top guide plate are aligned when the top guide plate is mated to the bottom fixture plate.

Optionally, the mating connectors disposed on the bottom fixture plate are four posts located in its corners and the complementary mating connectors disposed on the top guide plate are four apertures. The four apertures in the top guide plate align with the four posts in the bottom fixture plate, and the slot shaped apertures through the top guide plate align with the slots milled into the bottom fixture plate when the top guide plate is pressed into contact with the bottom fixture plate.

The cutting block has a cutting blade with an adjustable cutting depth and a tang on its bottom that fits into the channel. The method for using the apparatus is as follows:

1. placing the card in the first pocket of the bottom fixture plate;
2. covering the bottom fixture plate with the top guide plate;
3. inserting the cutting block into one of the channels formed in the top guide plate;
4. adjusting the cutting blade to a first desired depth;
5. locking the cutting blade at the first desired depth;
6. pulling the cutting block along the channel to cut the card to the desired depth;
7. removing the cutting block from the channel;
8. inserting the cutting block into another channel in the top guide plate at the end of the channel;
9. pulling the cutting block along the channel to cut the card to the desired depth;
10. removing the cutting block from the channel;
11. separating the top guide plate from the bottom fixture plate;
12. removing the card from the first pocket in the bottom fixture plate;
13. flipping the card over and placing the card in the second pocket;
14. covering the bottom fixture plate with the top guide plate;
15. adjusting the cutting blade to a second desired depth;
16. locking the cutting blade at the second desired depth;
17. inserting a cutting block into a channel formed in the top guide plate at an end of the channel;
18. pulling the cutting block along the channel to cut the card to the desired depth;
19. removing the cutting block from the channel;
20. breaking apart the laminated card along the cuts made on the first face to make samples of uniform width;
21. bending a sample along the cut made on the second face to create a tab.

In various embodiments, the device may include one or more of the following additional features: additionally sized plates to accommodate different sized ID cards; different spacings for channels to perform tests to different specifications; a second set of channels in the bottom fixture plate perpendicular to the first set of channels to create samples for a cross-hatch test described in ANSI 322 section 5.2; and multiple blades in one cutting block.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate several embodiments of the invention and together with the description, serve to explain the principles of the invention.

FIG. 4A is a plan view, FIGS. 4B and 4C are elevation views, and FIG. 4D is a perspective view of the bottom plate of the cutting block shown in FIG. 2.

FIG. 5A is a plan view, FIGS. 5B and 5C are elevation views, and FIG. 5D is a perspective view of the adjusting hub shown in FIG. 2.

FIG. 6A is a plan view, FIGS. 6B and 6C are elevation views, and FIG. 6D is a perspective view of the blade side cover shown in FIG. 2.

FIG. 9A is a plan view, FIGS. 9B and 9C are elevation views, and FIG. 9D is a perspective view of the bottom fixture plate shown in FIG. 2.

Figures 10A, 10B, 10C, 10D:
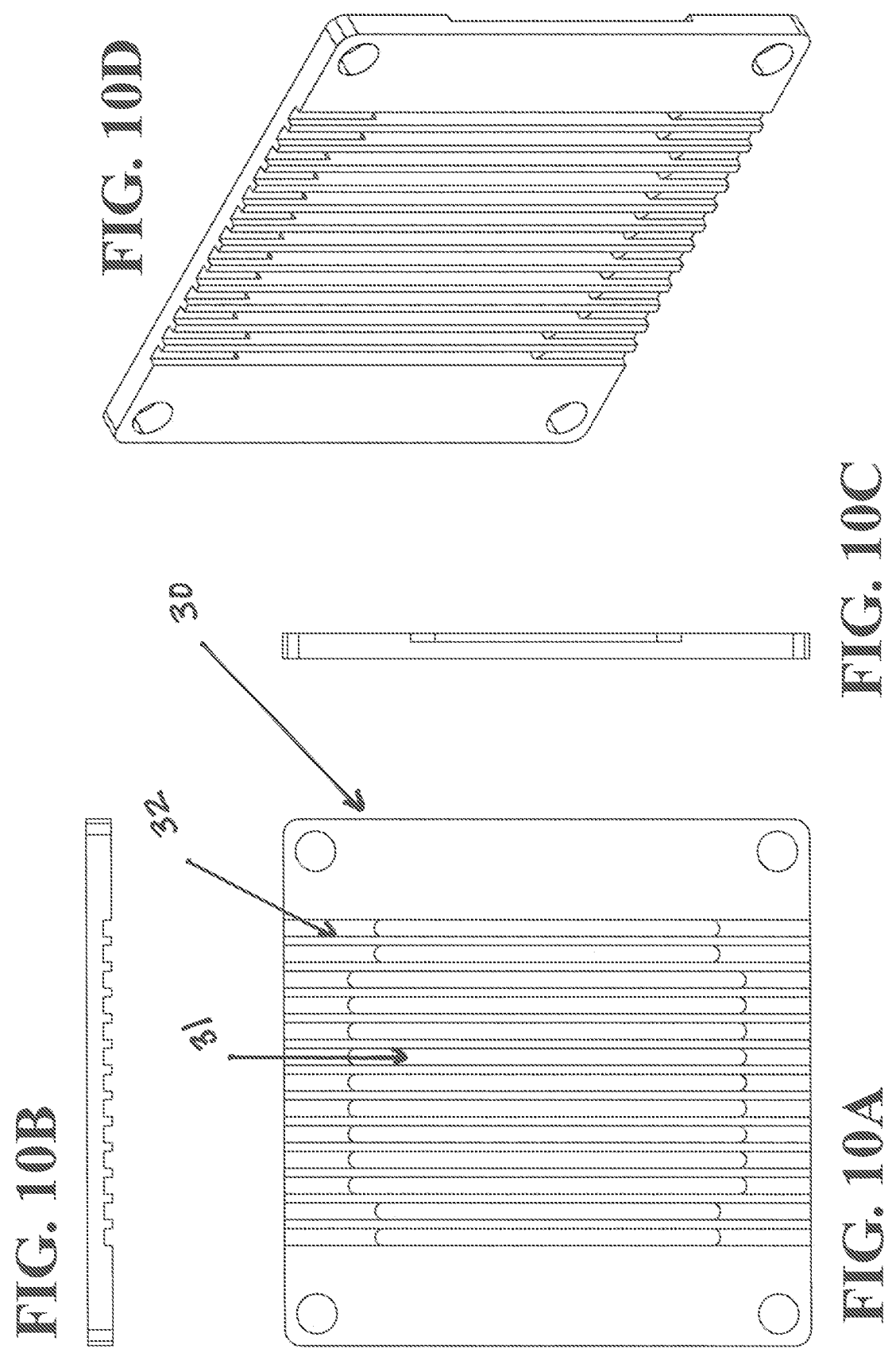

FIG. 10A is a plan view, FIGS. 10B and 10C are elevation views, and FIG. 10D is a perspective view of the top guide plate shown in FIG. 2.

FIG. 14A is a plan view, FIGS. 14B and 14C are side views, and FIG. 14D is a perspective view of the bottom fixture plate shown in FIG. 13.

DESCRIPTION OF THE INVENTION

Reference will now be made in detail to the exemplary embodiments of the invention, examples of which are illustrated in the accompanying drawings. Wherever possible, the same reference numbers will be used throughout the drawings to refer to the same or like parts.

According to exemplary embodiment shown in FIGS. 1 through 10, the invention relates to a system and method for producing peel test samples from laminated cards. Referring to FIGS. 1A through 1C, an ID card 10 has a first face 11 and a second face 12. The ID card peel sample preparation apparatus 1 allows a technician to cut an ID card 10 precisely and evenly to a desired depth and a set width of ten millimeters to generate multiple uniform peel test samples.

Figures 1A, 1B, 1C:
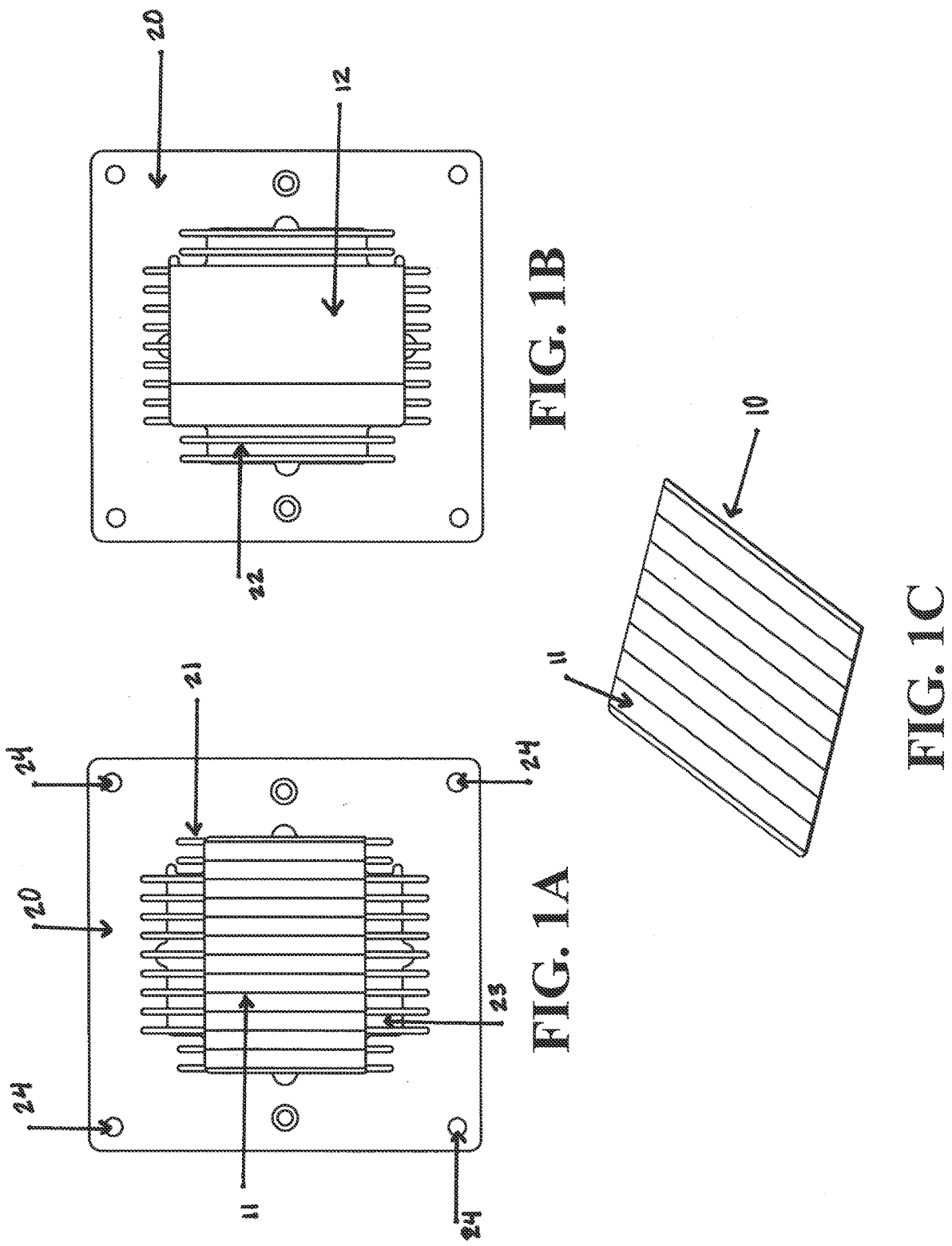
FIG. 1A is a plan view of a first side of an ID card in a bottom plate showing scoring on the card surface.
FIG. 1B is a plan view of a second side of the ID card in a bottom plate showing scoring on the card surface.
FIG. 1C is a perspective view of the ID card.
Figure 2:
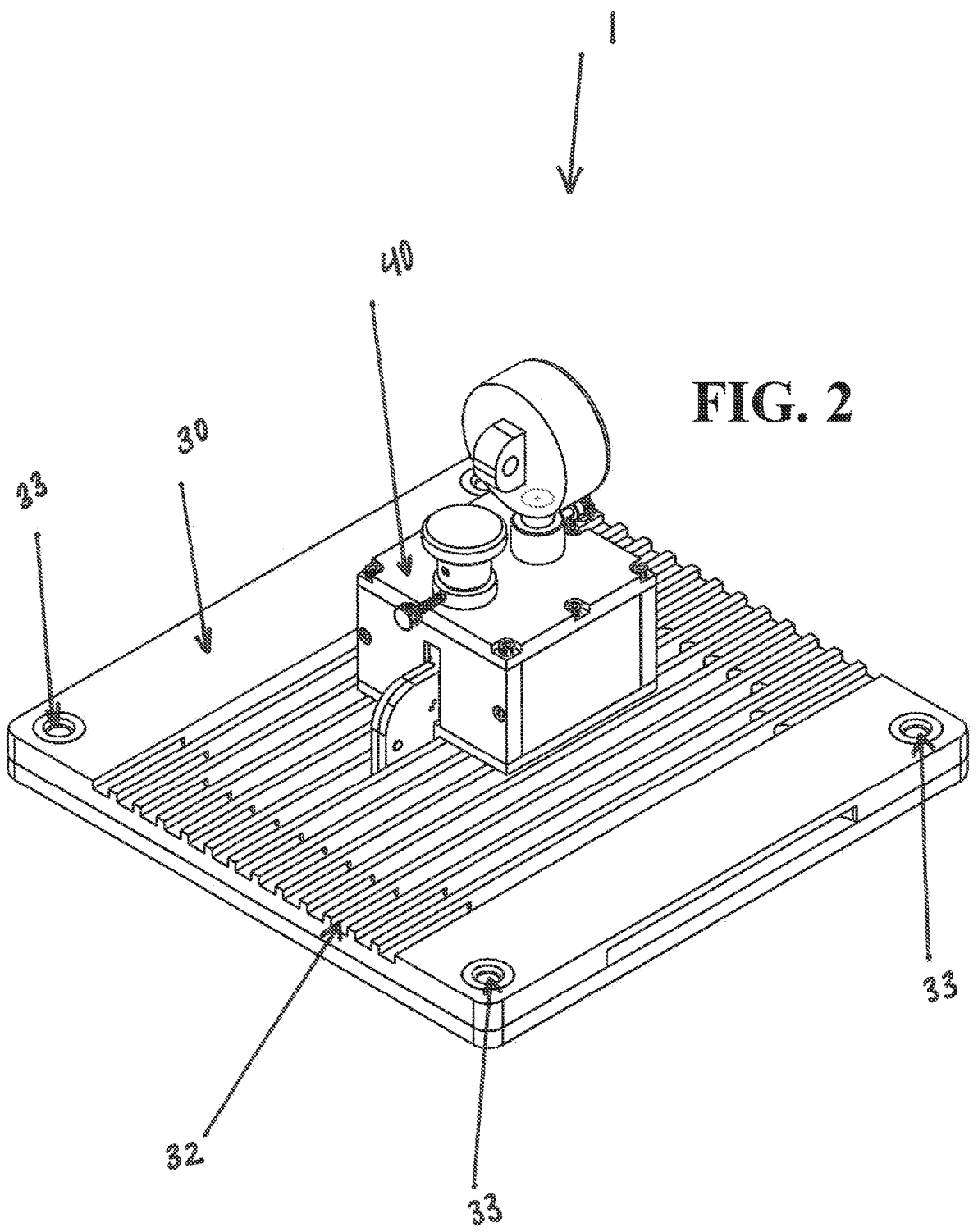
FIG. 2 is a perspective view of the preferred embodiment of the system.
Figure 3:
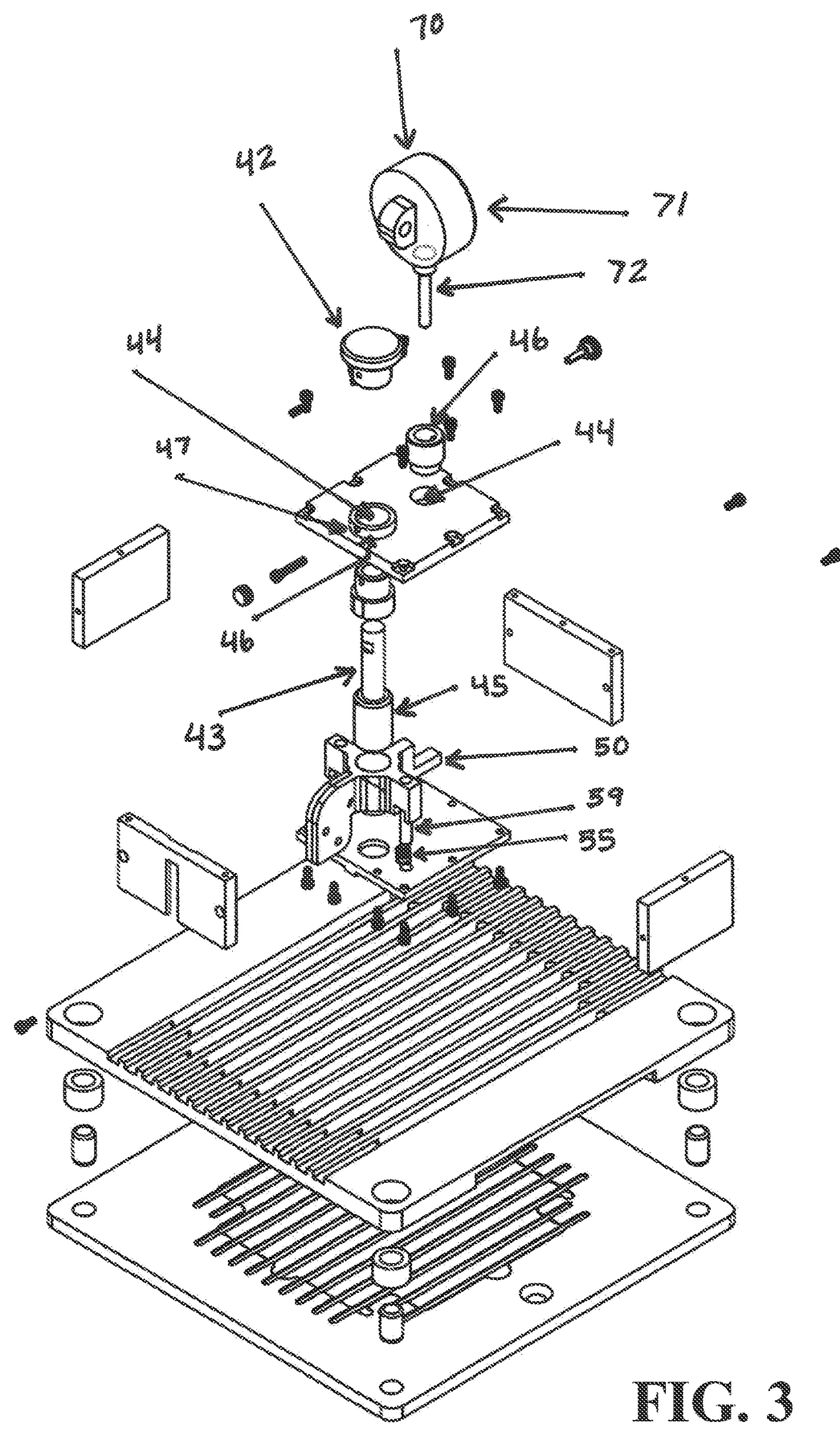
FIG. 3 is an exploded view of the system shown in FIG. 2.
Figure 7:
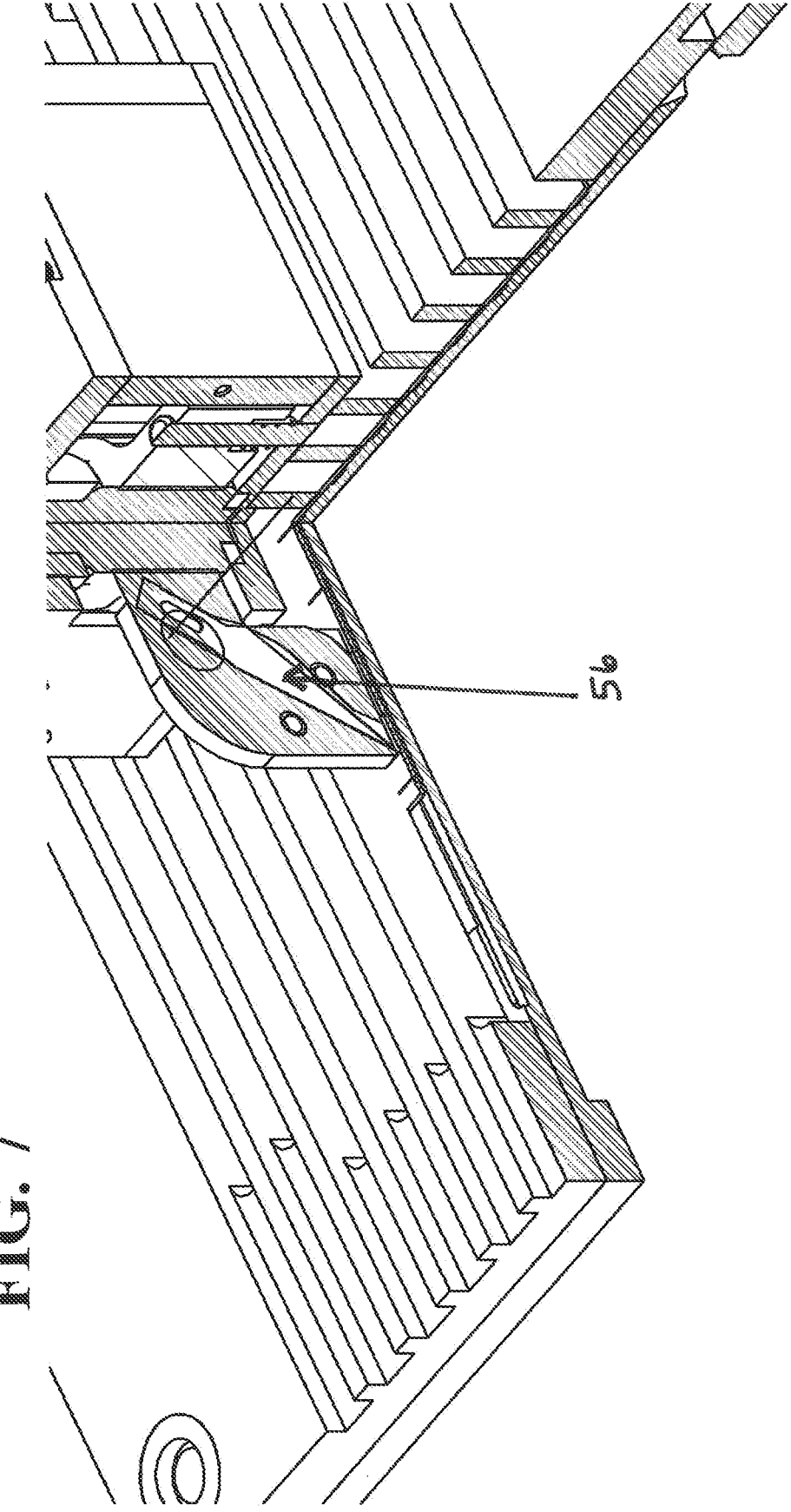
FIG. 7 is a section view of the system shown in FIG. 2.

Referring to FIG. 3, the bottom fixture plate 20 is preferably made from precision ground 0.250-inch aluminum plate. One set of slots 21 are milled into the bottom fixture plate 20. The set of slots 21 is milled on 10-millimeter centers parallel to one side of the bottom fixture plate 20. Two pockets 22, 23 are milled into the bottom fixture plate 20 at 90-degree angles from each other and at a depth of 0.020 inches. The pockets 22, 23 allow the card 10 to stay in place while the cutting is being performed. This also allows an operator to cut the card 10 vertically and horizontally without changing the setup of the preparation apparatus 1 by removing the card 10 from one pocket 22 and placing the card 10 into the other pocket 23. The preferred embodiment also includes four posts 24 pressed in the corners of the bottom fixture plate 20 to align an aluminum top guide plate 30 to be placed on top of the bottom fixture plate 20.

The top guide plate 30 is preferably made from precision ground 10-millimeter-thick aluminum plate. Slots 31 are milled through the top guide plate 30 on 10-millimeter centers. Also, there is a series of channels 32 milled into the top guide plate 30. Each channel 32 is centered on a slot 31. The top guide plate 30 includes four apertures 33 that are located in the corners of the top guide plate 30, which align with the four posts 24 pressed into the corners of the bottom fixture plate 20. The four apertures 33 align with the four posts 24 whether the top guide plate 30 is placed on the bottom fixture plate 20 in a first orientation or is placed on the bottom fixture plate in a second orientation 90-degrees from the first orientation. Depending which orientation the top guide plate 30 is placed relative to the bottom fixture plate 20, the slots 31 in the top guide plate 30 align with the set of slots 21 on the bottom fixture plate 20.

A cutting block 40 allows the technician to safely cut straight lines in the card 10 while pulling the cutting block 40 along the top guide plate 30. The cutting block 40 is a hollow box made of machined aluminum or other workable material. The cutting block 40 has a top, a bottom, and four sides, fixed together with screws or like fasteners. A tang 41 runs along the bottom of the cutting block 40 from the front of the cutting block 40 to the back of the cutting block and is centered on the bottom of the cutting block 40. The tang 41 fits into any one of the channels 32. The tang 41 rides in any one of the channels 32 to provide a guide for the cutting block 10 so that cuts in the cards are straight with uniform depth. In the preferred embodiment, the top of the cutting block has two apertures 44 milled through it. Each aperture has an upper bushing 46 pressed into it, which includes a set screw 47.

An adjusting hub 50 is located inside the cutting block 40. The structure of the adjusting hub 50 is shown in FIGS. 5 through 8. The adjusting hub 50 includes a cutting blade holder 51 that protrudes through the back of the cutting block 40. The adjusting hub 50 also includes a flange 54. An adjusting knob 42 is located at the top of the cutting block 40. The adjusting knob 42 is connected to a threaded adjusting rod 43 which passes through the top of cutting block 40 at one aperture 44. The threaded adjusting rod 43 is in rotatable contact with a nut 45 that is fixed in the adjusting hub 50 at aperture 52. Two other apertures 53 are located in the adjusting hub 50 on either side of aperture 52. A dowl 59 is slidably fitted inside each aperture 53, with one end of each dowl fixed to the bottom of the cutting blade holder 51.

The adjusting knob 42 allows the technician to raise and lower the adjusting hub 50, which includes the cutting blade holder 51. The cutting blade holder 51 contains a cutting blade 56. The adjusting hub 50 is kept in place with springs 55 which are placed around the dowls 59. The springs 55 are located between the adjusting hub 50 and the cutting block 40 at apertures 53. The springs 55 provide tension between the threads of the adjusting knob 42 and the nut 45 to keep thread backlash to a minimum.

The cutting blade holder 51 is shaped to hold securely a commercial cutting blade 56. The cutting blade 56 utilized in the preferred embodiment is an X-ACTO® style blade that fits into a pocket 57 in the cutting blade holder 51 that has been milled to the shape of the cutting blade 56. The preferred embodiment includes two pins 58 that the cutting blade 56 fits over to keep the cutting blade 56 from pulling out of the cutting blade holder 51 and to keep the cutting blade 56 in a cutting position. A blade side cover 60 is attached to the cutting blade holder 51 to hold the cutting blade 56 into position.

Figure 8:
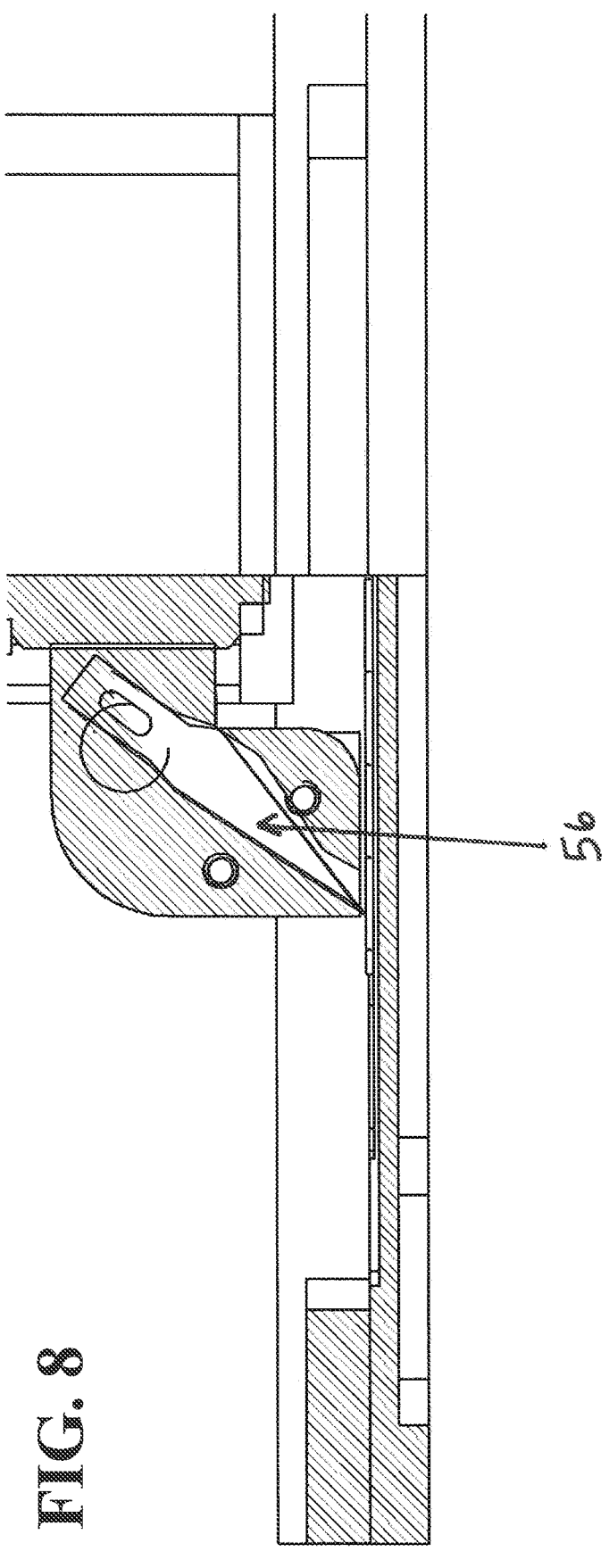
FIG. 8 is a close-up of the cutting blade holder shown in FIG. 7.

In the preferred embodiment, as shown in FIG. 8, the cutting blade 56 extends approximately 0.020 inches from the bottom of the cutting blade holder 51. Having the blade protrude from the bottom of the cutting blade holder 51 by about 0.020 inches reduces the amount of blade twisting and flexing during the cut. After the cutting block 40 is placed on the top guide plate 30 with the tang 41 fitted into a channel 32, the cutting blade 56 can be adjusted using the adjusting knob 42 to lower the cutting blade 56 through the slot 31 to contact the card 10.

In the preferred embodiment, a depth gauge 70 is inserted into the top of the cutting block 40 through upper bushing 46 to assist the operator when using the adjusting knob 42 to position the cutting blade 56 to a desired depth. The depth gauge 70 may be a commercial off the shelf part that includes a dial 71 and a needle 72. The needle 72 is inserted into the cutting block 40 at upper bushing 46 until the needle 72 contacts the flange 54 of the adjusting hub 50. Once the needle 72 contacts the flange 54, the dial 71 can be fixed to the cutting block 40 by tightening a set screw 47 located in the upper bushing 46.

To utilize the sample preparation apparatus 1, first, the card 10 is placed into the pocket 22 or 23 in bottom fixture plate 20. Next, the top guide plate 30 is placed over the bottom fixture plate 20 with the posts 24 of the bottom fixture plate 20 aligned with the apertures 33 in the top guide plate 30. The top guide plate 30 is pressed into contact with the bottom fixture plate 20 such that the card 10 will not become dislodged from the pocket 22 or 23. Next, the cutting block 40 is placed on the top guide plate 30 to the rear of the top guide plate 30, with the tang 41 fit into one of the channels 32, and the cutting blade holder 51 facing away from the technician. After the cutting block 40 is inserted into the track, the technician inserts the depth gauge 70 needle into the cutting block 40 at upper bushing 46 until the needle 72 contacts the flange 54 of the adjusting hub 50. Once the needle 72 contacts the flange 54, the dial 71 can be fixed to the cutting block 40 by tightening a set screw 47 located in the upper bushing 46. At this point, adjusting knob 42 can be used to lower the cutting blade 56 until the cutting blade 56 contacts the card 10. The depth gauge 70 is then zeroed. After the depth gauge 70 is zeroed, using the adjusting knob 42, the cutting blade 56 can be lowered to a desired cutting depth. Once the cutting blade depth is set, adjusting knob 42 is locked into position by tightening a set screw 47. At this point, the depth gauge 70 can be removed from the cutting block 40, if desired. Then, while maintaining pressure on the cutting block 40, the cutting block 40 is moved in the direction of slot 31, cutting into the laminated material. This procedure is then repeated for each slot 31 until the card 10 has been cut along each of the slots 31. Finally, the cutting block 40 is removed from the top guide plate 30 and the top guide plate from the bottom fixture plate 20. The card 10 can then be removed from the bottom fixture plate pocket 22 (or 23).

If desired, the card 10 can then be flipped over and put in the other pocket 23 (or 22) in the bottom fixture plate 20. In that case, following the procedure outlined above, the top guide plate 30 is again placed in position, the cutting block 40 is inserted into a channel 32, the cutting blade 56 is set to a desired depth, and makes one cut on one side of the card 10. The depth of the cut on the second side of the card 10 is the distance from the outer card surface to the desired depth of the laminate to be tested. This cut will be perpendicular to the cuts on the first side of the card 10. Once this second cut is made, the card 10 can be broken along the first set of cuts to form 10-millimeter-wide samples. Next, each sample is bent along the single perpendicular cut to form a tab that can then be affixed to a test unit to conduct the peel test.

Figure 11:
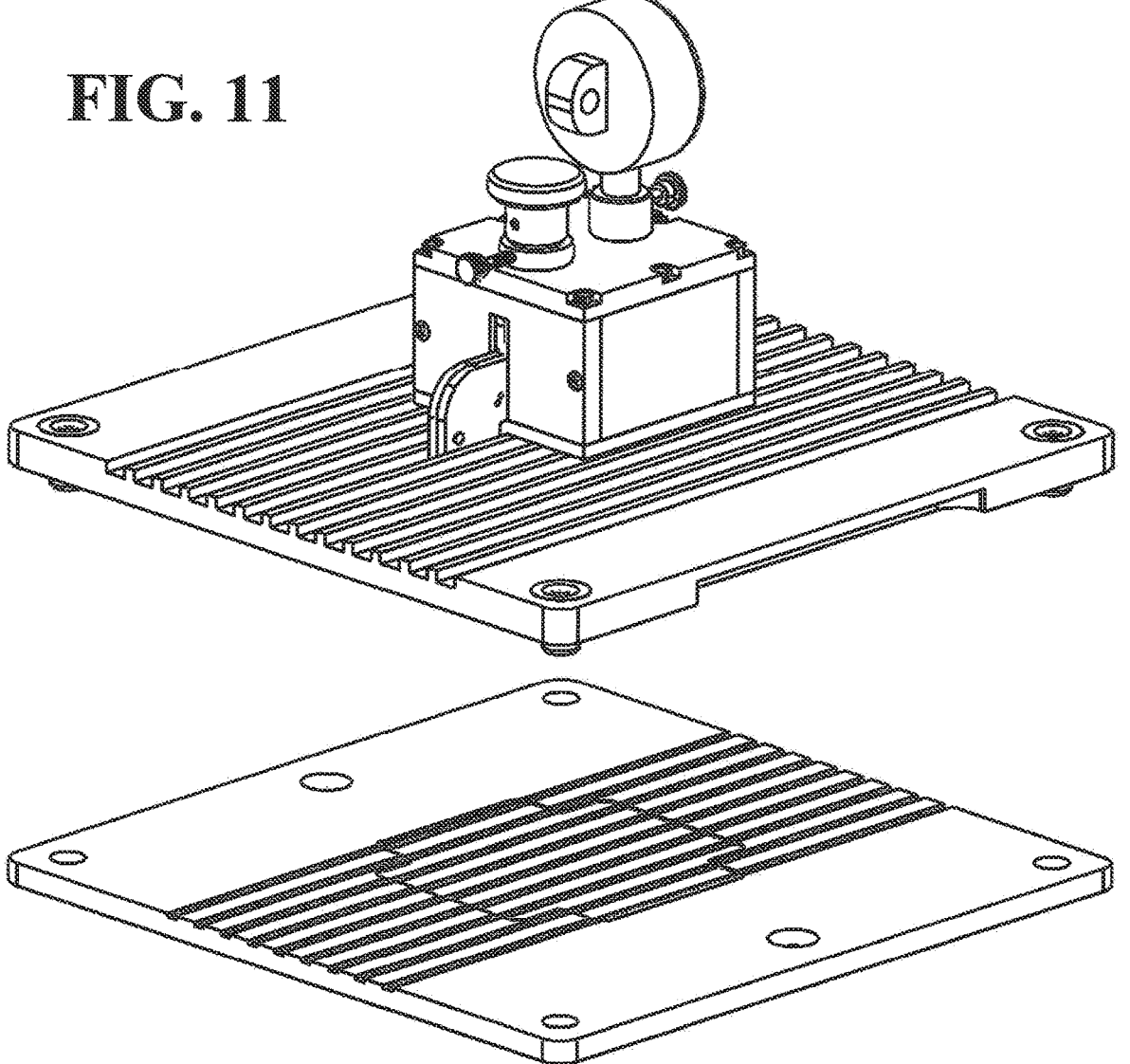
FIG. 11 is an exploded view of a second embodiment of the system.
Figures 12A, 12B, 12C, 12D:
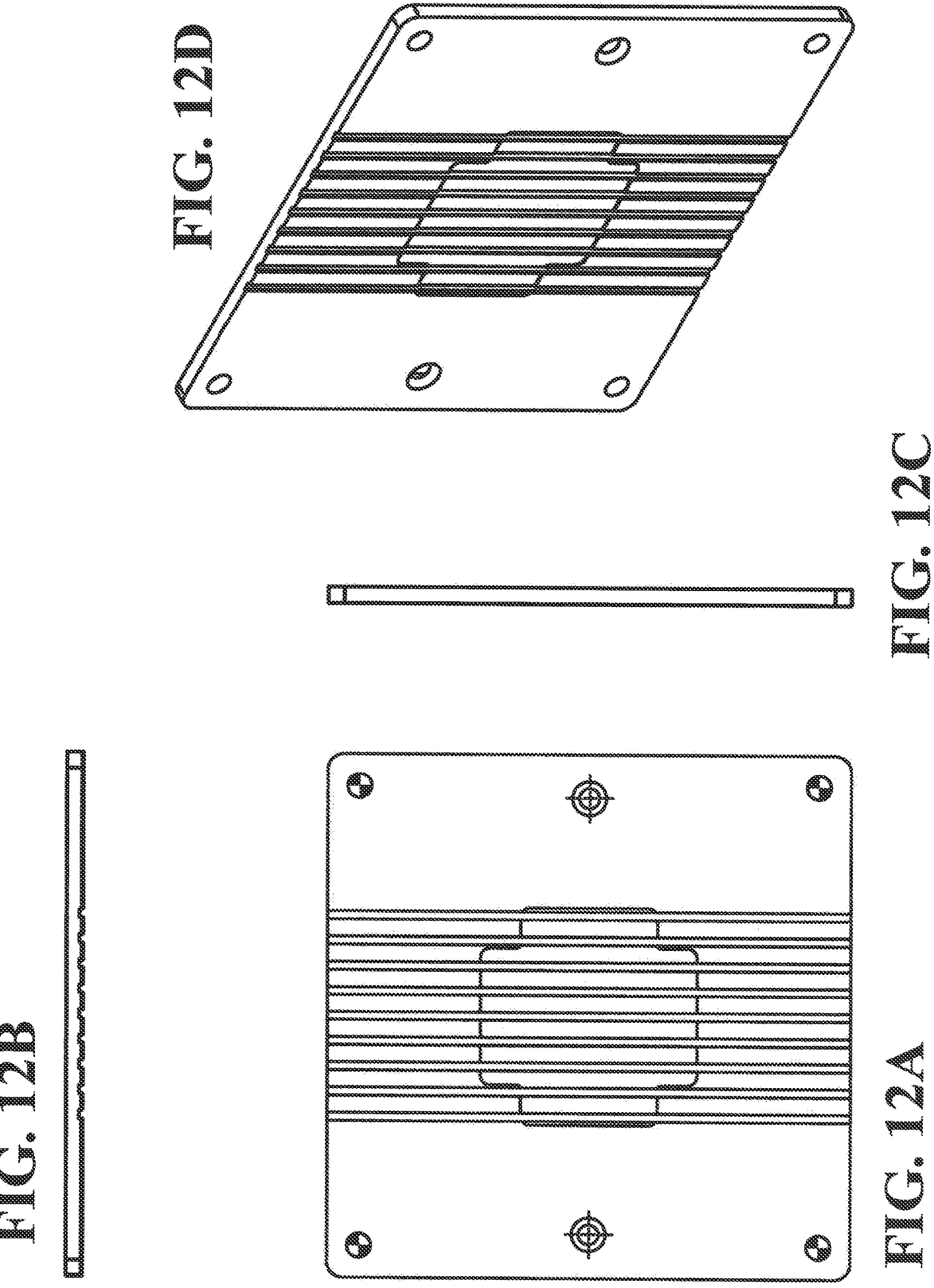
FIG. 12A is a plan view.
FIGS. 12B and 12C are side views.
FIG. 12D is a perspective view of the bottom fixture plate shown in FIG. 11.

FIGS. 11 and 12 show a second embodiment of the present invention that uses a bottom fixture plate with pockets sized to receive an ID3 card.

Figure 13:
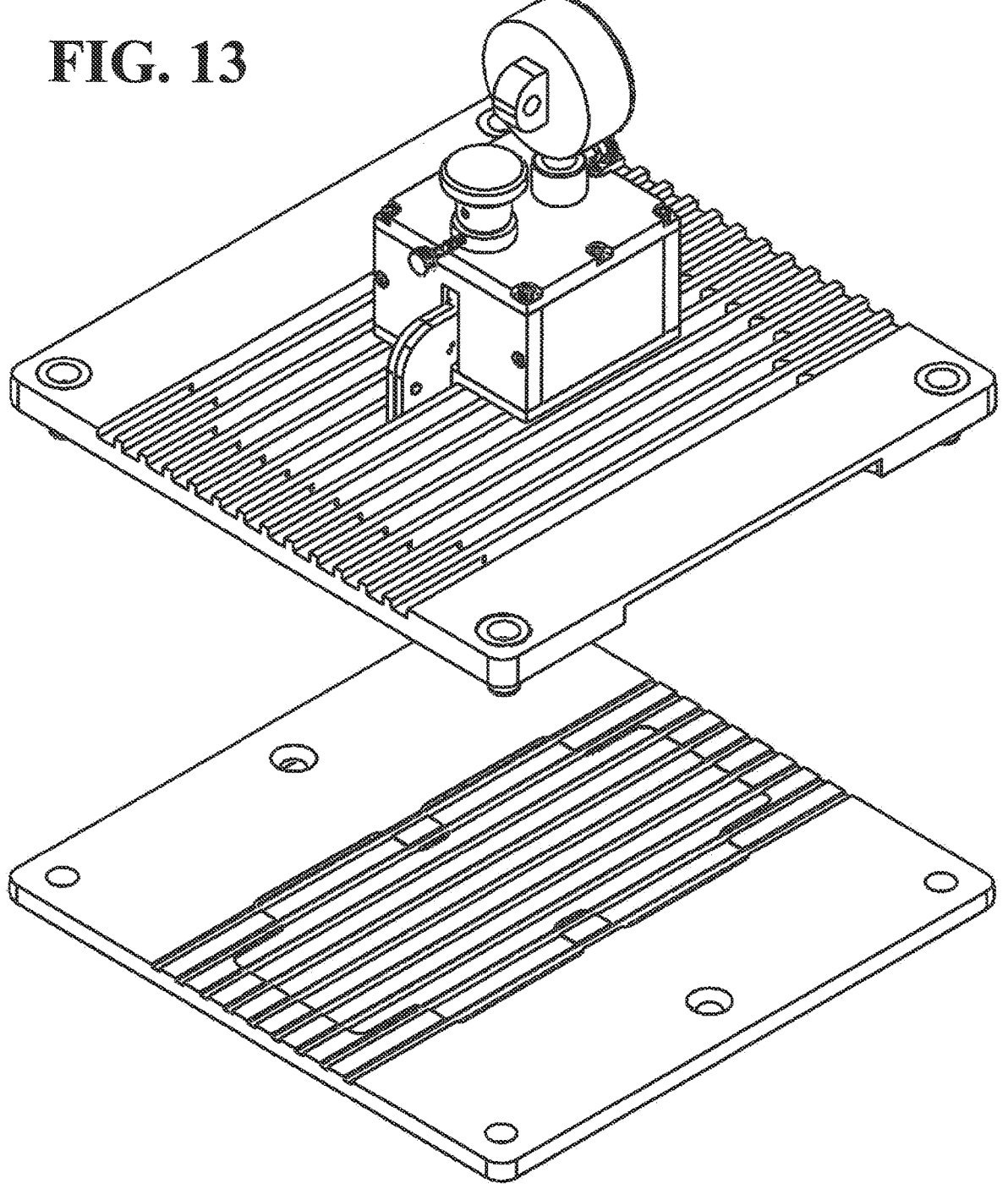
FIG. 13 is an exploded view of a third embodiment of the system.

FIGS. 13 and 14 show a third embodiment of the present invention that uses a bottom fixture plate with pockets sized to allow more than one ID card to be cut at the same time.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. An apparatus for creating uniform peel test samples from a multilayered card comprising:

a bottom fixture plate having a plurality of mating connectors, a first pocket, and a first set of slots disposed thereon, the first pocket sized to receive a card made of multiple layers, each one of the first set of slots located parallel to one side of the bottom fixture plate;

a top guide plate having a series of channels each having a slot shaped aperture, a plurality of complementary mating connectors disposed on the top guide plate so as to align with the plurality of mating connectors disposed on the bottom fixture plate when the top guide plate is placed on the bottom fixture plate and the channel slots align with the first set of slots located on the bottom fixture plate;

a cutting block having a top, a bottom and four sides, a tang on the bottom of the cutting block that fits into the channel found in the top guide plate and is sized to fit into any one of the channels, an adjusting hub located inside the cutting block having a center aperture, a cutting blade holder extending from the center aperture that protrudes from the rear of the cutting block and is shaped to receive a cutting blade, and a flange that extends from the center aperture;

a threaded adjusting rod that is rotatably connected to the adjusting hub and passes through an aperture in the top of the cutting block and is connected to an adjusting knob located above the top of the cutting block so that the cutting blade holder can be moved up and down as the adjusting knob is turned.

2. The apparatus of claim 1, wherein the adjusting rod is held in place by a set screw.

3. The apparatus of claim 1, wherein the bottom fixture plate has a second pocket disposed therein, wherein the first pocket and the second pocket are oriented orthogonally with respect to each other.

4. The apparatus of claim 3, wherein the plurality of complementary mating connectors disposed on the top guide plate align with the plurality of mating connectors disposed on the bottom fixture plate whether the top guide plate is placed on the bottom fixture plate in a first orientation or is placed on the bottom fixture plate in a second orientation perpendicular to the first orientation.

5. The apparatus of claim 1, wherein a second set of slots are milled at 10-millimeter centers into the bottom fixture plate parallel to one side of the bottom fixture plate and at a 90-degree angle from the first set of slots.

6. The apparatus of claim 1, further including a blade side cover, wherein the blade side cover is attached to the cutting blade holder to hold the cutting blade in the cutting blade holder.

7. The apparatus of claim 1, wherein the first set of slots are milled into the bottom fixture plate at 10-millimeter centers.

8. The apparatus of claim 1, wherein the channels are of uniform width and length.

9. The apparatus of claim 1, wherein the channel slots are spaced on 10-millimeter centers.

10. The apparatus of claim 1, further having a depth gauge having a depth gauge needle inserted into the top of the cutting block through an aperture and the tip of the needle sits on the flange.

11. The apparatus of claim 1, wherein the cutting blade extends approximately 0.020 inches from the bottom of the cutting blade holder.

12. The apparatus of claim 1, wherein the adjusting hub further includes two stabilizing flanges that extend on opposite sides from the center aperture, each stabilizing flange includes an aperture to receive a dowel, and a stabilizing spring slips over each dowl such that the stabilizing spring extends from the stabilizing flange to contact the bottom of the cutting block.

13. The apparatus of claim 1, wherein the adjusting rod is in rotatable contact with a nut that is fixed in the center aperture.

14. The apparatus of claim 1, wherein the adjusting hub is in connection with the base of the cutting block by springs.

15. The apparatus of claim 1, wherein the bottom fixture plate includes a plurality of apertures to allow the bottom fixture plate to be fixed to a surface.

16. The apparatus of claim 1, wherein the plurality of mating connectors disposed on the bottom fixture plate are posts extending from the bottom fixture plate and the complementary mating connectors on the top guide plate are apertures in the top guide plate.

17. An apparatus for creating uniform peel test samples from a multilayered card comprising:

a bottom fixture plate having a pocket, a plurality of slots, and a plurality of mating connectors disposed thereon;

a top guide plate having a plurality of channels, each channel having a slot shaped aperture, and a plurality of complementary mating connectors, wherein the slots in the bottom fixture plate align with the slot shaped apertures in the top guide plate when the complementary mating connectors of the top guide plate and the mating connectors of the bottom fixture plate are aligned and the top guide plate is in contact with the bottom fixture plate; and a cutting block having a tang formed on the underside of the cutting block, an adjusting hub including a cutting blade, and an adjustment shaft wherein the adjusting hub can be moved in a direction perpendicular to the top guide plate by movement of the adjusting shaft.

18. A method for creating uniform peel test samples from multilayered laminated cards comprising:

providing a card having a first face and a second face opposite the first face;

placing the card in a first pocket formed in a bottom fixture plate, the bottom fixture plate having a set of slots formed onto the bottom fixture plate with the set of slots parallel to one side of the bottom fixture plate, and a plurality of mating connectors disposed on the bottom fixture plate;

covering the bottom fixture plate with a top guide plate, the top guide plate having a series of channels formed into it that are of uniform width and length, each channel having a slot shaped aperture through the center of the channel, and a plurality of complementary mating connectors disposed on the top guide plate;

inserting into one of the channels formed in the top guide plate a cutting block having a cutting blade with an adjustable cutting depth and a tang on its bottom that fits into the channel;

adjusting a cutting blade to a first desired depth;

locking the cutting blade at the first desired depth;

pulling the cutting block along the channel to cut the laminated card to the desired depth;

removing the cutting block from the channel;

inserting the cutting block into another channel in the top guide plate at the end of the channel and pulling the cutting block along the channel to cut the laminated card to the desired depth and then removing the cutting block from the channel;

separating the top guide plate from the bottom fixture plate;

removing the card from the first pocket in the bottom fixture plate;

flipping the card over and placing the card in a second pocket in the bottom fixture plate that is oriented 90-degrees from the first pocket in the bottom fixture plate;

covering the bottom fixture plate with the top guide plate;

adjusting the cutting blade to a second desired depth;

locking the cutting blade at the second desired depth;

inserting a cutting block into a channel formed in the top guide plate at an end of the channel;

pulling the cutting block along the channel to cut the laminated card to the desired depth;

removing the cutting block from the channel;

breaking apart the laminated card along the cuts made on the first face to make samples of uniform width;

bending a sample along the cut made on the second face to create a tab.

19. The method of claim 18, wherein the bottom fixture plate has slots and the top guide plate has slot shaped apertures that are aligned when the top guide plate is mated to the bottom fixture plate.

20. The method of claim 18, wherein the mating connectors disposed on the bottom fixture plate are four posts located in its corners and the complementary mating connectors disposed on the top guide plate are four apertures, and wherein the four apertures in the top guide plate align with the four posts in the bottom fixture plate, and the slot shaped apertures through the top guide plate match up with the slots milled into the bottom fixture plate when the top guide plate is pressed into contact with the bottom fixture plate.

* * * * *